US 8,117,094 B2

(12) United States Patent
Multerer et al.

(10) Patent No.: US 8,117,094 B2
(45) Date of Patent: Feb. 14, 2012

(54) DISTRIBUTION CHANNELS AND MONETIZING

(75) Inventors: Boyd Cannon Multerer, Redmond, WA (US); William T. Flora, Seattle, WA (US); Bret P. O'Rourke, Kirkland, WA (US); John Mark Miller, Kirkland, WA (US); Eric Peter Wilfrid, Mountain View, CA (US); Nigel Stuart Keam, Redmond, WA (US); Steven N. Bathiche, Kirkland, WA (US); Oliver Roup, Seattle, WA (US); James Morris Alkove, Woodinville, WA (US); Zachary Lewis Russell, Bellevue, WA (US); Jon Marcus Randall Whitten, Sammamish, WA (US); Andrew David Wilson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/771,395

(22) Filed: Jun. 29, 2007

(65) Prior Publication Data
US 2009/0006225 A1 Jan. 1, 2009

(51) Int. Cl.
*G06Q 10/00* (2006.01)
*G06Q 30/00* (2006.01)
*G06Q 20/00* (2006.01)
*G06G 1/14* (2006.01)

(52) U.S. Cl. ....... 705/28; 705/1.1; 705/14.4; 705/14.69; 705/14.72; 705/26.5; 705/22

(58) Field of Classification Search ............... 705/1, 22, 705/26, 28, 14.4, 14.72
See application file for complete search history.

(56) References Cited

U.S. PATENT DOCUMENTS

| | | | |
|---|---|---|---|
| 5,375,206 A | 12/1994 | Hunter et al. | |
| 5,717,604 A | 2/1998 | Wiggins | |
| 5,892,900 A | 4/1999 | Ginter et al. | |
| 6,195,646 B1 | 2/2001 | Grosh et al. | |
| 6,731,393 B1 * | 5/2004 | Currans et al. | 358/1.12 |
| 6,920,437 B2 | 7/2005 | Messina | |
| 6,920,567 B1 | 7/2005 | Doherty et al. | |
| 6,954,738 B2 | 10/2005 | Wang et al. | |
| 6,963,859 B2 | 11/2005 | Stefik et al. | |
| 7,103,663 B2 | 9/2006 | Inoue et al. | |
| 7,155,415 B2 | 12/2006 | Russell et al. | |
| 7,216,178 B2 * | 5/2007 | Juszkiewicz | 709/231 |
| 7,334,720 B2 * | 2/2008 | Hulst et al. | 235/380 |
| 2001/0037304 A1 | 11/2001 | Paiz | |
| 2002/0007282 A1 * | 1/2002 | Utsumi | 705/1 |

(Continued)

FOREIGN PATENT DOCUMENTS
WO WO0241211 A1 5/2002
(Continued)

OTHER PUBLICATIONS

"Activity Desktop Management", Copyright 2006 Activ Australia Pty Lld., Sydney NSW, 2 pages.

(Continued)

*Primary Examiner* — Ig T An
(74) *Attorney, Agent, or Firm* — Lee & Hayes, PLLC (57) ABSTRACT

A system to facilitate royalty tracking is provided. The system includes at least one tag to identify a portion of a creative work. A distribution component tracks the portion of the creative work and a crediting component reports usage of the creative work when the portion is detected in a larger body of work.

20 Claims, 10 Drawing Sheets

U.S. PATENT DOCUMENTS

| | | | |
|---|---|---|---|
| 2002/0091642 A1* | 7/2002 | Rahnasto | 705/52 |
| 2002/0112171 A1 | 8/2002 | Ginter et al. | |
| 2002/0138441 A1 | 9/2002 | Lopatic | |
| 2002/0169700 A1 | 11/2002 | Huffman et al. | |
| 2003/0078875 A1 | 4/2003 | Moore et al. | |
| 2003/0131252 A1 | 7/2003 | Barton | |
| 2003/0140009 A1 | 7/2003 | Namba et al. | |
| 2003/0171949 A1 | 9/2003 | Degnan et al. | |
| 2003/0220883 A1 | 11/2003 | Block et al. | |
| 2003/0233330 A1 | 12/2003 | Raley et al. | |
| 2004/0039779 A1 | 2/2004 | Amstrong et al. | |
| 2004/0039916 A1 | 2/2004 | Aldis et al. | |
| 2004/0088730 A1 | 5/2004 | Gopalan et al. | |
| 2005/0027616 A1 | 2/2005 | Jones et al. | |
| 2005/0076334 A1 | 4/2005 | Demeyer | |
| 2005/0177434 A1 | 8/2005 | Davie | |
| 2005/0256805 A1 | 11/2005 | Satkunanathan et al. | |
| 2005/0289072 A1 | 12/2005 | Sabharwal | |
| 2006/0053079 A1 | 3/2006 | Edmonson et al. | |
| 2006/0075505 A1 | 4/2006 | Murthy et al. | |
| 2006/0095974 A1 | 5/2006 | Ito et al. | |
| 2006/0106725 A1 | 5/2006 | Finley, Jr. et al. | |
| 2006/0107046 A1 | 5/2006 | Raley et al. | |
| 2006/0179002 A1 | 8/2006 | Brooks et al. | |
| 2006/0229994 A1 | 10/2006 | Moulckers et al. | |
| 2006/0242081 A1 | 10/2006 | Ivanov et al. | |
| 2006/0271494 A1 | 11/2006 | Ito | |
| 2007/0038527 A1* | 2/2007 | Sako et al. | 705/26 |
| 2007/0038574 A1 | 2/2007 | Fanning et al. | |
| 2007/0073596 A1 | 3/2007 | Alexander et al. | |
| 2007/0078737 A1 | 4/2007 | Jung et al. | |
| 2007/0100757 A1* | 5/2007 | Rhoads | 705/51 |
| 2007/0122111 A1 | 5/2007 | Yamamoto et al. | |
| 2007/0219924 A1 | 9/2007 | Shea et al. | |
| 2007/0233564 A1 | 10/2007 | Arnold | |
| 2007/0244828 A1 | 10/2007 | Shahbodaghi | |
| 2008/0207329 A1 | 8/2008 | Wallace et al. | |
| 2008/0208749 A1 | 8/2008 | Wallace et al. | |
| 2008/0319859 A1* | 12/2008 | Rhoads | 705/14 |
| 2009/0006225 A1 | 1/2009 | Multerer et al. | |
| 2009/0132403 A1 | 5/2009 | Titus et al. | |
| 2009/0132422 A1 | 5/2009 | Booth et al. | |
| 2009/0132435 A1 | 5/2009 | Titus et al. | |
| 2009/0210333 A1 | 8/2009 | Titus et al. | |

FOREIGN PATENT DOCUMENTS

| | | | |
|---|---|---|---|
| WO | WO2006051463 A1 | 5/2006 | |
| WO | WO2006074284 A2 | 7/2006 | |
| WO | WO2007098035 A2 | 8/2007 | |

OTHER PUBLICATIONS

Courcoubetis et al., "Market Models for P2P Content Distribution", First International Workshop on Agents and Peer-To-Peer Computing (AP2PC), Bologna, Italy, Jul. 2002, 10 pages.

Coyle, "The Automation of Rights", The Journal of Academic Librarianship, vol. 32, No. 2, May 2006, pp. 326-329.

Daugherty, "Creating a Digital Music Marketplace", An iMEG Publication, Mar. 2002, pp. 1-20.

Dibbell, "The Life of Chinese Gold Farmer", The New York Times, Jun. 17, 2007, 9 pages.

"Document Authoring Incentive System", Center for Research in Electronic Commerce, UT-Austin, 2002, 7 pages.

DomAPI, "License Wizard", Copyright 2001-2006 Nebiru Software, 1 page.

Johnson, "Creative Pricing in Markets for Intellectual Property" Property, Review of Economic Research on Copyright Issues, vol. 2, No. 1, 2005, pp. 5-10.

"License Wizard Example", Trolltech Labs Blogs, 2007, 7 pages, retrieved Oct. 25, 2007 at <<http://doc.trolltech.com/4.3/dialogs-licensewizard.html>>.

"Privacy Commissioner to Create Digital Template of Privacy Legislation", Center for Digital Government, Government Technology Internationsl News Report, Sep. 2003, 2 pages, retrieved Aug. 17, 2007 at <<http://www.centerdigitalgov.com/international/story.php?docid=628273>>.

Rickbehnke, "What's your content worth? Let the social market set the price", Oct. 13, 2007, retrieved on Oct. 25, 2007 at<<www.socialmediatoday.com/SMC/18742>>, 4 pages.

Sheppard et al., "Protecting Privacy with the MPEG-21 IPMP Framework", 6th International Workshop on Privacy Enhancing Technologies, Cambridge, UK, Jun. 28-30, 2006, Lecture Notes in Computer Science 4258, pp. 152-171.

Terdiman, "Meet the Metaverse, Your New Digital Home", CNET News.com, Apr. 16, 2007, 2 pages, retrieved on Sep. 21, 2007 at <<http://www.news.cm/2102-1025_3-6175973.html?tag=st.util.print>>.

"The IBM Innovate Quick internal metaverse project", Virtual worlds in education—Eduserv Symposium, Congress Centre, London, UK, May 10, 2007, 8 pages, eightbar blog retrieved on Sep. 21, 2007 at <<http://eightbar.co.uk/2006/05/08/the-ibm-innovate-quick-internal-metaverse-project>>.

Office Action U.S. Appl. No. 11/771,395 (Feb. 17, 2009) cited in IDS U.S. Appl. No. 11/943,616.

US Official Action U.S. Appl. No. 11/943,616 (Nov. 24, 2008) cited in IDS U.S. Appl. No. 11/943,617.

US Official Action U.S. Appl. No. 11/943,616 (Mar. 18, 2009) cited in IDS U.S. Appl. No. 11/943,617.

US Official Action U.S. Appl. No. 11/943,616 (Aug. 7, 2009) cited in IDS U.S. Appl. No. 11/943,617.

US Official Action U.S. Appl. No. 12/031,687 (Oct. 6, 2009) cited in IDS U.S. Appl. No. 11/943,617.

US Official Action U.S. Appl. No. 12/031,687 (Oct. 6, 2009) cited in IDS U.S. Appl. No. 11/943,616.

Office Action U.S. Appl. No. 12/031,687 (Apr. 14, 2009) cited in IDS U.S. Appl. No. 11/943,616.

Weblo.com, "Virtual World, Real Profit!", Latest Developments, Global Launch-News Release, Oct. 16, 2007, 5 pages, retrieved on Oct. 26, 2007 at <<http://www.weblo.com/comments/index.php?Action=Comments.LatestDevelopmentList>>.

* cited by examiner

DISTRIBUTION CHANNELS AND MONETIZING

BACKGROUND

One of the greatest problems that plague current business models is how to enforce and reward intellectual property rights. This problem has become even more insidious when the Internet persists data that may only be employed as a portion of a greater collaborative effort, yet the individual components of the effort may not be properly recognized as such. One attempt to control how rights are enforced is sometimes referred to as Digital Rights Management or DRM.

Digital rights management technologies attempt to control or prevent access to or copying of digital media, which can otherwise be copied with very little cost or effort. Copyright holders, content producers, or other financially or artistically interested parties have historically objected to copying technologies, before digital media. Examples have included player piano rolls early in the 20th century, audio tape recording, and video tape recording where the advent of digital media only increased concerns. While analog media inevitably loses quality with each copy generation and in some cases even during normal use, digital media files may be copied an unlimited number of times with no degradation in the quality of subsequent copies. Digital Audio Tape, thought by many observers of the time to be a probable replacement for the audio cassette, was a market failure in part due to opposition to it on grounds of unauthorized copying potential.

With the advent of personal computers, the ease of ripping media files from a CD or from radio broadcast, combined with the internet and popular file sharing tools, has made unauthorized dissemination of copies of digital files (often referred to as digital piracy) much easier. This has concerned some digital content publishers, leading some to pursue DRM technologies to try to prevent those actions. Although technical controls on the reproduction and use of software have been intermittently common since the 1970s, the term DRM has come to primarily mean the use of these measures to control copyrightable artistic content. Some DRM technologies enable content publishers to enforce access policies that go beyond preventing copyright violations, and also prevent legal fair use. These also tend to discourage collaborative efforts between creative entities.

While DRM is most commonly used by the entertainment industry (e.g., films and recording), it has found use in other media as well. Many online music stores, as well as certain e-books producers, have adopted various DRM schemes in recent times. In recent years, a number of television producers have begun demanding implementation of DRM measures to control access to the content of their shows in connection with the popular TiVo time-shifting recorder system, and its equivalents, for example.

An early example of a DRM system is the Content Scrambling System (CSS) employed by the DVD Forum on movie DVDs since circa 1996. The scheme used a simple encryption algorithm, and required device manufacturers to sign a license agreement restricting the inclusion of certain features in their players, such as a digital output which could be used to extract a high-quality digital copy of the movie. Thus, the only consumer hardware capable of decoding DVD movies was controlled, albeit indirectly, by the DVD Forum, restricting the use of DVD media on other systems until the release of DeCSS, which allowed a CSS-encrypted DVD to play properly on a computer using Linux, for which the Alliance had not arranged a licensed version of the CSS playing software.

The current DRM system does not satisfy all needs however. For instance, DRM opponents argue that the presence of DRM infringes existing private property rights and restricts a range of heretofore normal and legal user activities. For example, a DRM component could control a device a user owns (such as an MP3 player) by restricting how it may act with regards to certain content, overriding some of the user's desires (for example, preventing the user from burning a copyrighted song as part of a compilation or a review). An example of this effect may be seen in some systems in which content is disabled or degraded depending on the DRM scheme's evaluation of whether the hardware and its use are secure. All forms of DRM depend on the DRM enabled device (e.g., computer, DVD player, TV) imposing restrictions that cannot be disabled or modified by the user. These restrictions also tend to limit creative efforts between entities and make it difficult to properly compensate those who create valuable intellectual property.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Micro distribution components are provided that monitor, track, recognize, and reward creative or proprietary data as the data is employed or created initially and deployed possibly in a larger or separate body of work. Components such as micro tags are associated with a particular piece of data where that tag provides a historical link to those who deserve credit and compensation. This facilitates such aspects as micro licensing and transactions at the point of data deployment or utilization. Dynamic advertising can be provided offering reasons for people to participate in a given promotion. This can include location based promotions at the point of sale and based on detected profiles. Tagging allows collectives to participate or contribute a creative piece and each time that piece is used, a trace is credited back to the original data. This also allows for and promotes derivative creations where a new piece is created from the sum of other original works. As users are rewarded for sharing their creative works, new derivative works that are the aggregate of previous work can be facilitated since users have an incentive to collaborate.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Systems and methods are provided for automatically detecting creative works and compensating those responsible for the works. In one aspect, a system to facilitate royalty tracking is provided. The system includes at least one tag to identify a portion of a creative work. A distribution component tracks the portion of the creative work and a crediting component reports usage of the creative work when the portion is detected in a larger body of work. The system may also include a security component to protect validity of the tag, where the security component enables usage of the creative work.

As used in this application, the terms "component," "tag," "aggregation," "security," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
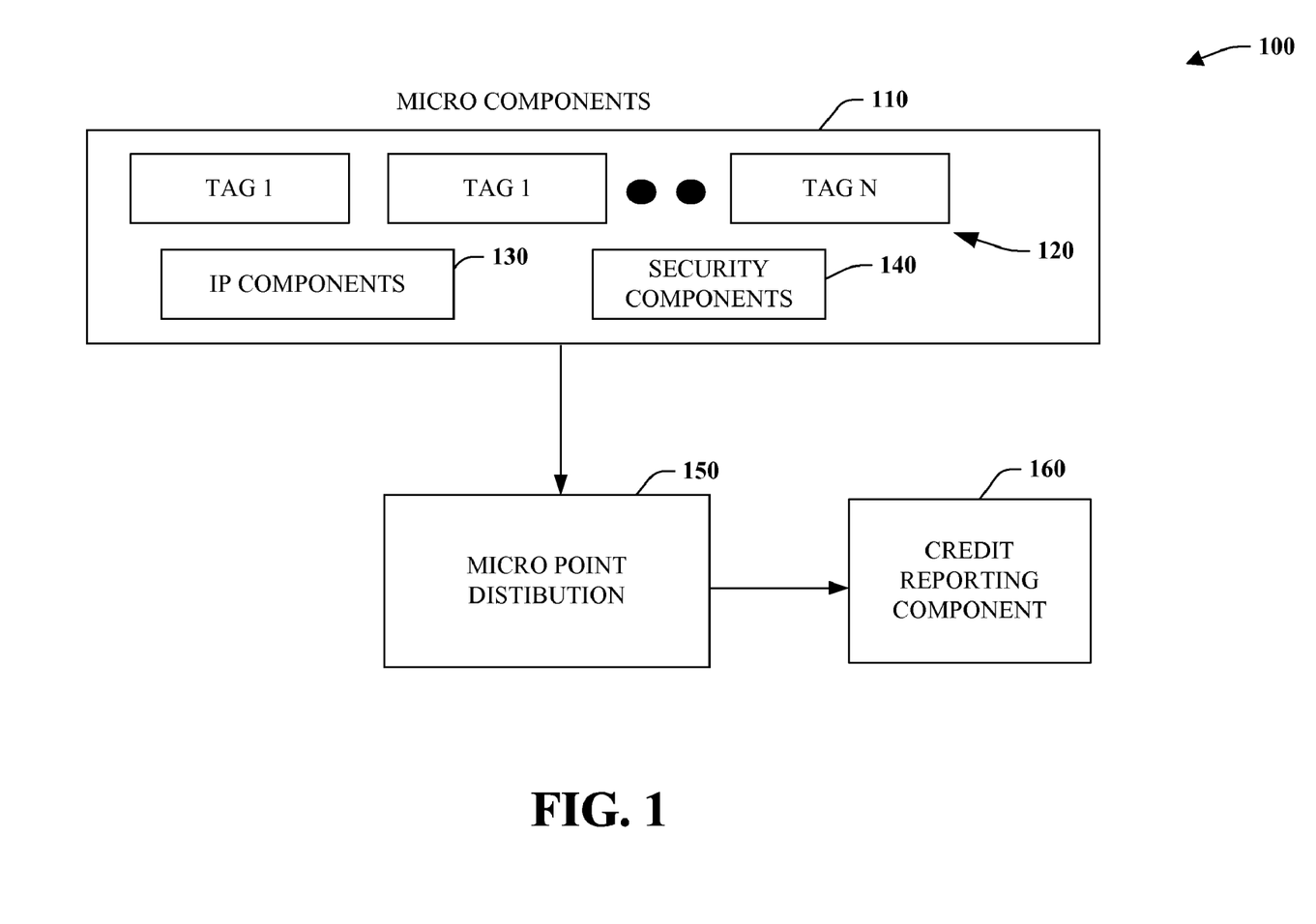
FIG. 1 is a schematic block diagram illustrating an automated distribution system for intellectual property tracking and reporting.

Referring initially to FIG. 1, an automated distribution system 100 for intellectual property tracking and reporting. The system 100 includes micro components 110 that are employed to provide tracing, tracking, and accounting capabilities for data. The micro components 110 include one or more tags 120 that provide a historical link to all those who may have contributed intellectual property shown as IP components 130 to the micro components 110. For example, the IP components 130 may be a musical score that was collaborated upon by three different musicians, where three tags 120 are assigned for each of the respective musicians. As the IP components 130 are downloaded or otherwise utilized for various purposes, the tags 120 associated therewith can be used to facilitate a suitable accounting (to the three musicians in this example) for use of the IP components. As will be described in more detail below, the IP components 130 may be further utilized in other intellectual property endeavors where another tag 120 may be assigned to the subsequent endeavor thus forming a derivative work from the previous collection of IP components 130.

As shown, one or more security components 140 may be provided. These can include components that facilitate that the micro components 110 remain substantially intact to prevent non-permitted access to the IP components 130. For example, this may include encryption or other data encoding techniques between tag 120 and IP components 130, such that if the IP components were attempted to be extracted without the tags then the IP components would no longer function for their intended purpose. After the micro components 110 have been constructed, a micro point distribution component 150 receives the micro components where the tags 120 can be analyzed and credit reporting performed at 160. For example, the distribution component 150 could be a cell phone or music device that receives the micro components 110 from the Internet over a wireless connection. The tags 120 are then reported to the credit reporting component 160 before the IP components 130 can be enabled. The reporting at 160 can be performed in substantially real time or buffered for reporting at some later time. For example, a user of the micro point distribution 150 may have an account with the credit reporting component 160 that is accountable at some other time. After the tags have been received by the credit reporting component 160, all those associated with the tags can be compensated for their respective contributions to the IP components 130.

In general, micro components 110 monitor, track, recognize, and reward creative or proprietary data as the data is employed or created initially and deployed possibly in a larger or separate body of work. Components such as micro tags 120 are associated with a particular piece of data where that tag provides a historical link to those who deserve credit and compensation. This facilitates such aspects as micro licensing and transactions at the point of data deployment or utilization such as at the micro point distribution 150. In one aspect, the micro components 110 enable dynamic advertising that can be provided offering reasons for people to participate in a given promotion. This can include location based promotions at the point of sale and based on detected profiles. Tagging allows collectives to participate or contribute a creative piece and each time that piece is used, a trace is credited back to the original data at 160. This also allows for and promotes derivative creations where a new piece is created from the sum of other original works.

As will be described in more detail below, micro licensing can include automated procedures for handling and crediting based on digital rights management (DRM) and initial uploading. This can include the ability to invoke micro law suits or other negotiations via detected electronic transactions. If desired, users can subscribe to a database where they are free to use the data in the database to create their own original works. Other aspects include tailoring content or trans-coding based on capabilities of a respective device. For instance, music device technology could be transferred to TV and vice versa. A company can also aggregate technologies and license based on their reputation as aggregators. This could also allow the company to share credit information to other companies who are part of the aggregate. This can also include employing third party managers and systems to form aggregates. Licensing schemas and definitions can be generated and employed to facilitate the micro licensing and negation tracking. This can include defining security considerations within the schema. Other facilitators include peer to peer exchange of data to mitigate or eliminate cell tower exchanges. Additionally, universal or electronic gaming currencies can be developed to facilitate collaborations and legal maneuvers across borders. If desired, users can be allowed to offer carrier services where they can rent a portion of their memory device and deliver such data as they travel. Other aspects include multiple modern integration to support distribution services. In yet another aspect, a micro distribution system 100 is provided. The system includes means for marking intellectual property components within a set of data (tags 120) and means for distributing the set of data (micro point distribution 150). This can also include means for reporting royalties associated with the intellectual property components within the set of data (credit reporting component 160).

Figure 2:
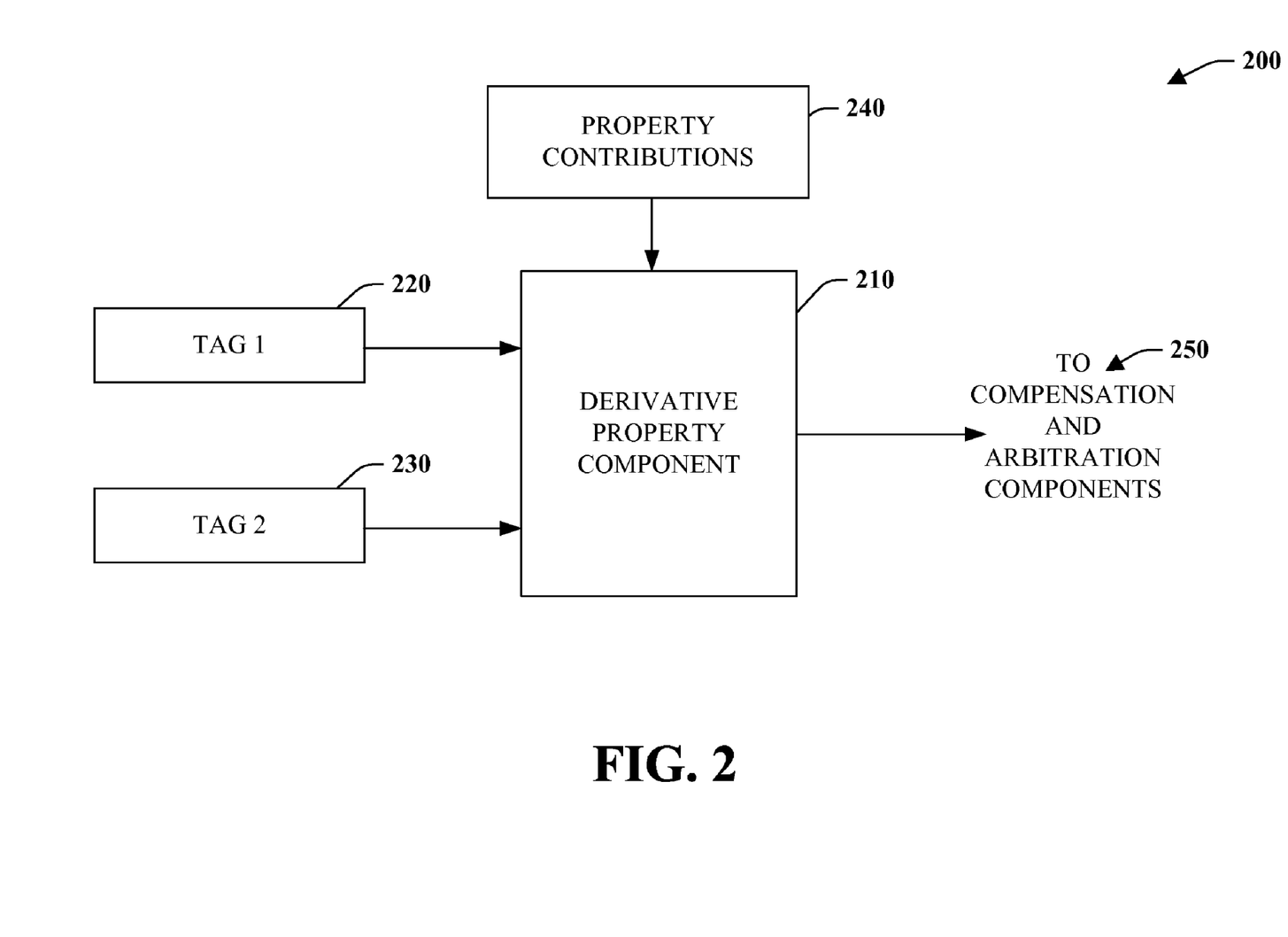
FIG. 2 is a block diagram that illustrates a system for creating and generating derivative properties.

Referring now to FIG. 2, a system 200 illustrates components for derivative property creation and management. The system 200 includes a derivative property component 210 that receives tags 220 and 230. Although two tags 220 and 230 are shown in this example, it is to be appreciated that more or less than two tags can be similarly processed by the derivative property component 210. The tags 220 and 230 are associated with one or more intellectual property contributions 240. Thus, if a user were to create a piece of property using one or more components of someone else's property, the respective property contributions from all parties can be received at the derivative property component 210. As shown, after derivative works have been created and processed by the derivative property component 210, outputs 250 can be sent to compensation or arbitration components that are described in more detail below.

In general, the derivative property component 210 allows users to create property from other works of art yet still be able to compensate creators of the other works. For example, an artist may create a painting at 240 which is associated with a respective tag such as at 220. An advertiser may desire to use the artist contribution at 240 in a display add for example in a super market. As will be described in more detail below, schemas can be provided that describes terms and conditions for employing a piece of property at 240. If the advertiser uses the artwork in an ad, the ad can be associated with a subsequent tag 230 identifying the ad and the underlying component of artwork. The derivative component can process the ad as a unit yet still credit all the components of individual property 240 that went into the ad via the tags 220 and 230.

In another example, several users may have recorded an event from different angles and tagged each version of their respective captures. A third party may desire to combine one or more of the video captures into a subsequent presentation. Each of the respective video contributions can be tagged and submitted to the derivative component, where the collection of tags can be identified to the entity that has assembled such property 240. Whenever the collective is employed in a subsequent work, all the tags associated with the collective can later be process by the derivative component and subsequently sent to a compensation center for royalty or other type distribution.

In a musical or audio example, when musicians create some component of music, they can tag their work and define terms for using their respective creations. Other musicians can employ the work in a subsequent work utilizing one or more tagged components of property. When revenue is derived from the collective or aggregated work, those contributing to the collective can be compensated by tracing to the tags that define the collective. Security aspects can be encoded with the tags and the property contributions such that if an attempt to separate the tags from the property, then the property would become non-functional for further employment. It is also possible to perform encodings such that tag or other metadata associated with a respective piece of property at 240 are combined in such a manner that the only functional usage of the underlying property is by utilizing the combination of tag and property. For instance, utilizing the tag as a seed to encrypt the underlying property 240. As noted above, In general, the tags 220 and 230 can be employed to monitor, track, recognize, and reward creative or proprietary data 240 as the data is employed or created initially and deployed possibly in a larger or separate body of work. Components such as the tags 220 and 230 can be associated with a particular piece of data where that tag provides a historical link to those who deserve credit and compensation. This facilitates such aspects as micro licensing and transactions at the point of data deployment or utilization such as at the micro point distribution which is described in more detail below.

Figure 3:
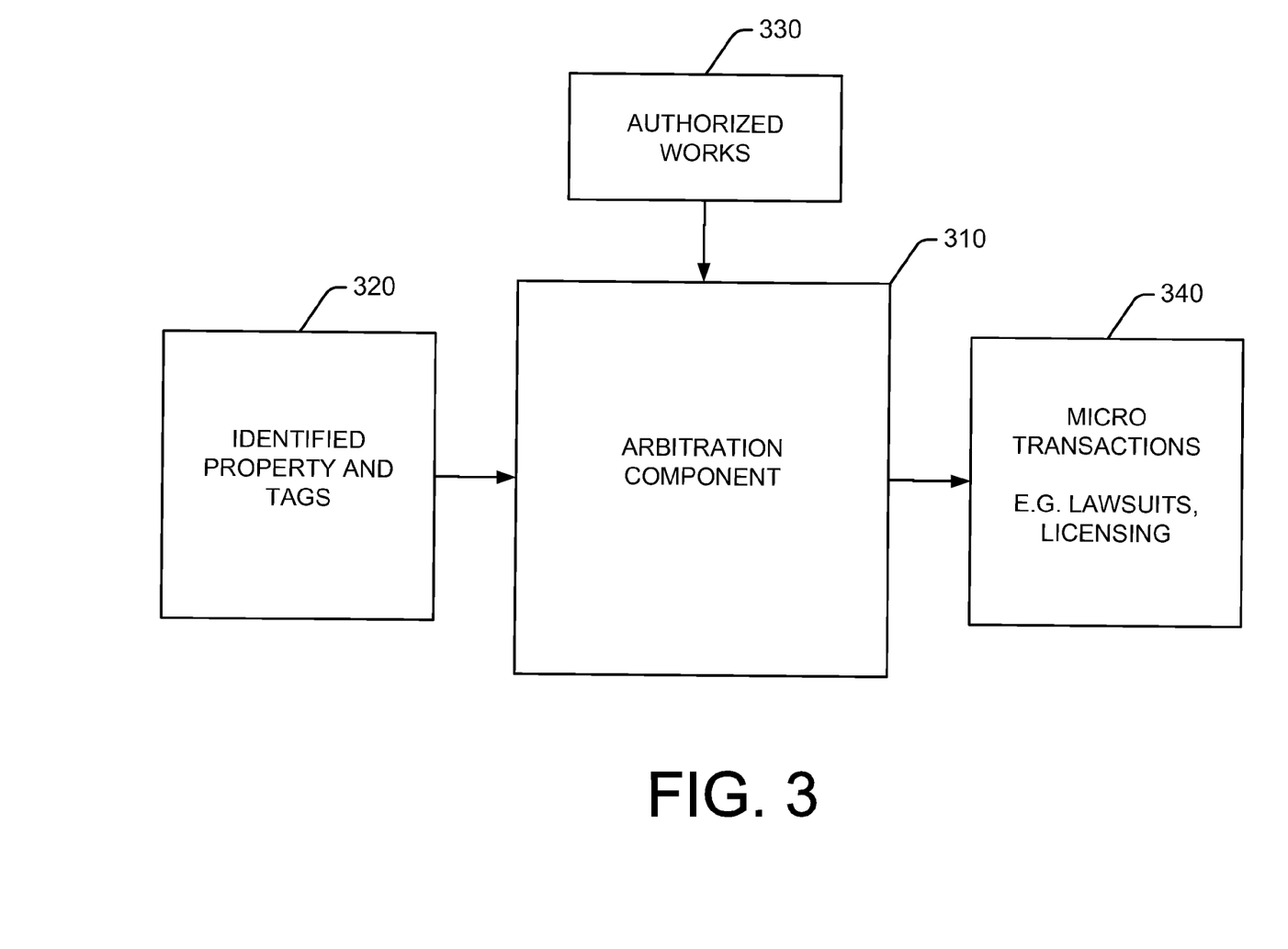
FIG. 3 illustrates a system for arbitration processing and micro transactions.

Turning to FIG. 3, a system 300 illustrates arbitration and processing for micro transactions. The system 300 includes an arbitration component 310 that processes identified property and tags 320. Such processing can include data such as authorized works information at 330. The authorized works data 330 can include schemas, files, or other digital indications on the limits or uses for a given component of intellectual property. In view of the authorized works data 330, the identified property and tags 320 can be further analyzed by the arbitration component 310. A micro transactions component 340 can be invoked if discrepancies or unauthorized usage is detected by the arbitration component 310.

Basically, substantially any electronic transaction or usage can be analyzed by the arbitration component 310. For example, if a music provider received a respective work that was identified at 320, the work could be further processed by the arbitration component to determine of the components in the work have suitably credited the underlying creators and owners of the respective intellectual property. As noted previously, the arbitration component can facilitate micro licensing between entities which can include automated procedures for handling and crediting based on digital rights management (DRM) and initial uploading, for example. This can include the ability to invoke micro law suits or other licensing negotiations at 340 via detected electronic transactions identified at 320.

In one specific example, a musical score is identified at 320 and analyzed by the arbitration component 310. Authorized works data 330 may indicate that the musical score is a derivative work where three separate entities are involved in its production and are to be credited each time the score is downloaded. The arbitration component 310 receives the identified property 320 and analyzes it to determine if the three components are so identified and/or if there are other entities associated with the score. If differences exist between the identified property 320 and the authorized works 330, one or more micro transactions can be automatically initiated at 340. This could include polite e-mails requesting royalty agreements or electronic payments. Another type of transaction could include an automated license agreement. If further actions were required, micro transactions could include the initiation of digital lawsuits where the respective infringing entities are identified, records of the infringement are identified, and court papers automatically generated and filed to facilitate further action. As can be appreciated, substantially any type of automated or electronic transaction can be initiated at 340. In addition, substantially any type of electronic data such as files, text, audio, video, and so forth can be analyzed by the arbitration component 310 to determine if appropriate tagging is in place to properly credit the underlying creators of a given work.

Figure 4:
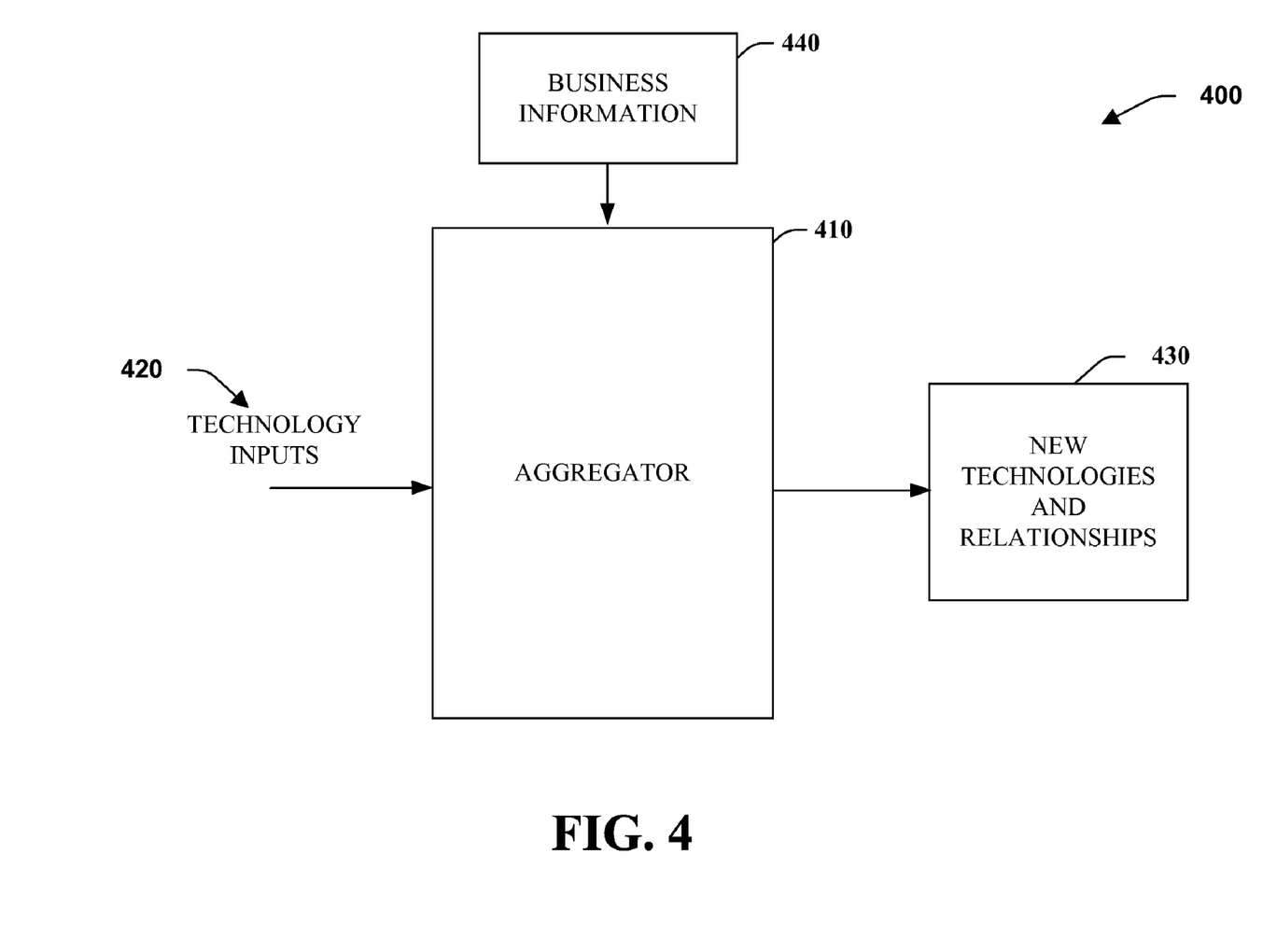
FIG. 4 illustrates an aggregation system to form property agreements.

Referring to FIG. 4, an aggregation system 400 to form property agreements is provided. An aggregator 410 processes one or more technology inputs 420, where one or more new technologies 430 are created from the inputs. As noted above, an entity can aggregate technologies 420 and license to those entities based on their reputation as aggregators. This could also allow the entity to share business information 440 (e.g., credit information, agreements, terms, conditions) to other companies who are part of the aggregate. This can also include employing third party managers and systems to form aggregates.

In general, the aggregator 410 can be employed to build intellectual property from other components of property and facilitate maintaining agreements between the respective components. In one specific example, the inputs 420 could include a screen play, a musical score, and art designs for scenes in the screen play. The aggregator can process the inputs 420, determine crediting arrangements for each of the inputs, and continue to operate to enforce the new technology 430. In this example, the new technology may be created under the umbrella of a movie but it is to be appreciated that substantially any type of technology configuration can be managed. For example, the aggregator 410 could receive several different schema files at 420, where an aggregated schema of the respective files was distributed and maintained. As the aggregated schema were deployed and utilized, components of the underlying schema can be credited for their respective contributions to the aggregated schema. In still yet another example, the technology inputs 420 may simply be relationships that are to be maintained. For instance, a purchase agreement, a car on a parking lot, an options file, and customized tires that are utilized on the car as opposed to other cars on the lot.

Figure 5:
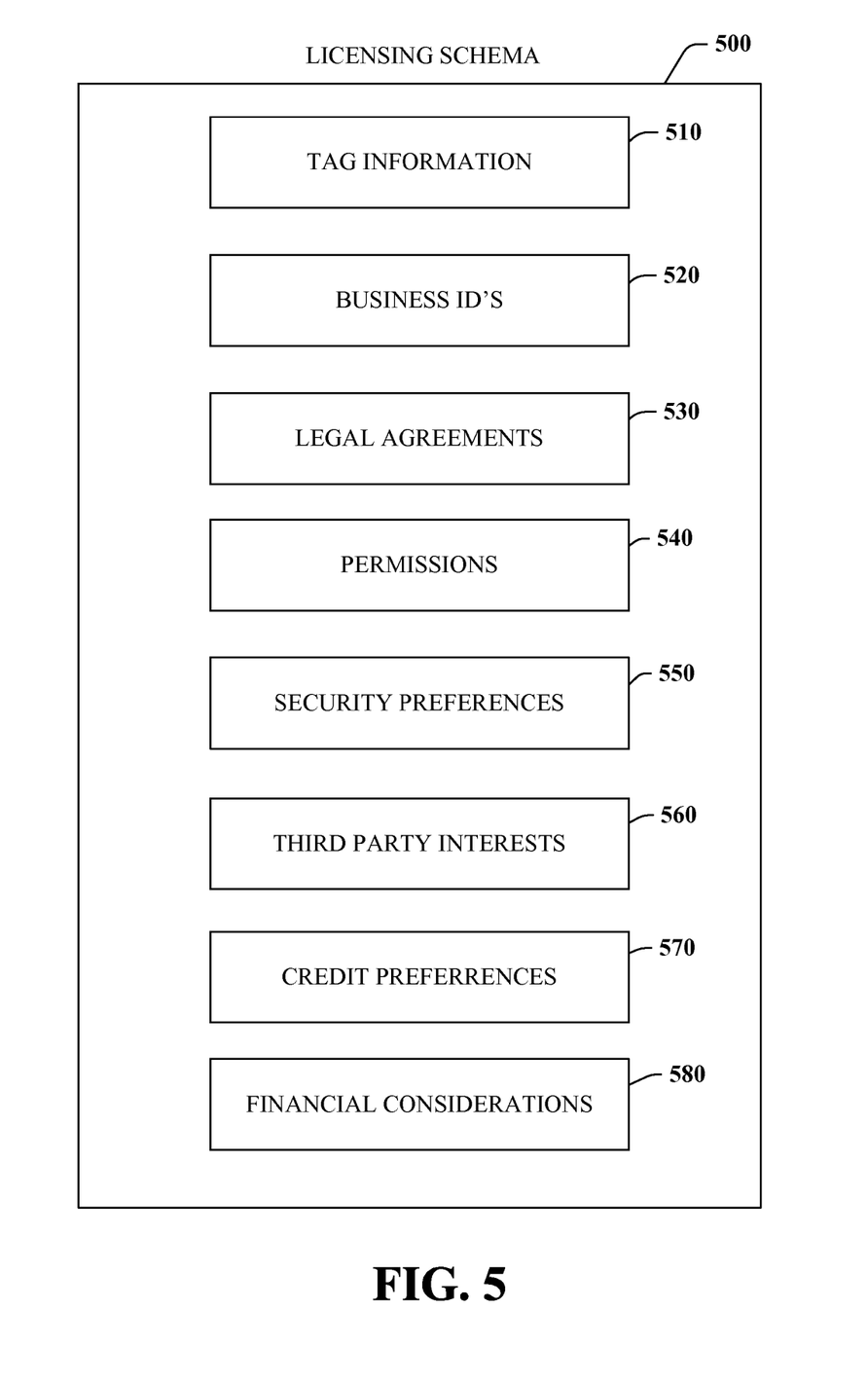
FIG. 5 illustrates an example user profile that can be employed to control summary generation.

Proceeding to FIG. 5, an example licensing schema 500 is illustrated. The licensing schema 500 can include substantially any component that facilitates transactions and agreements between entities. At 510, tag information can be provided. The tags are employed to identify a component of intellectual property such that when the component is employed, the tags provide tracing information for the property. At 520, any type of business identifications is provided. This can include an individual's identification or some other type of identification such as an assignee name for a business that owns intellectual property. At 530, any type of legal agreements that are to be supported by the property is identified. This can include royalty arrangements, licensing requirements, or information relating to current litigation the underlying property may be associated with at a given time. At 540, one or more permissions can be provided. These may include electronic enablers that give permission to a specific entity to employ intellectual property. These also may identify other valid or invalid derivative combinations that may be in force.

Proceeding to 550, one or more security preferences may be specified. This can include preferred encryption schemes or other factors such as what type of encryption is to be employed by derivative components that may be aggregated to form a subsequent work. At 560, third party interest can be identified. This can include defining the role and legal arrangements for institutions such as banks, distributors, aggregators, and so forth. At 570, one or more credit preferences can be specified to indicate acceptable forms of payment and terms for receiving payment. At 580, any other financial considerations to facilitate a given transaction are identified.

Before proceeding, it is noted that the schema 500 can be supported in several languages. Generally, a schema is a model for describing the structure of information. It's a term borrowed from database components to describe the structure of data in relational tables. In the context of XML for example, the schema describes a model for a class of documents and data files. The model describes the possible arrangement of tags and text in a valid document, for example. The schema 500 can also be viewed as an agreement on a common vocabulary for a particular application that involves exchanging documents. In schemas, models are generally described in terms of constraints. A constraint defines what can appear in any given context. There are basically two types of constraints: content model constraints describe the order and sequence of elements and data type constraints describe valid units of data. For example, a schema might describe a valid <address> with the content model constraint that it consists of a <name> element, followed by one or more <street> elements, followed by one <city>, <state>, and <zip> element. The content of a <zip> might have a further data type constraint that it consist of either a sequence of exactly five digits or a sequence of five digits, followed by a hyphen, followed by a sequence of four digits, for example. One application of the schema 500 is to allow machine validation of document structure. Thus, an individual document which doesn't violate any of the constraints of the model is, by definition, valid according to that schema.

Figure 6:
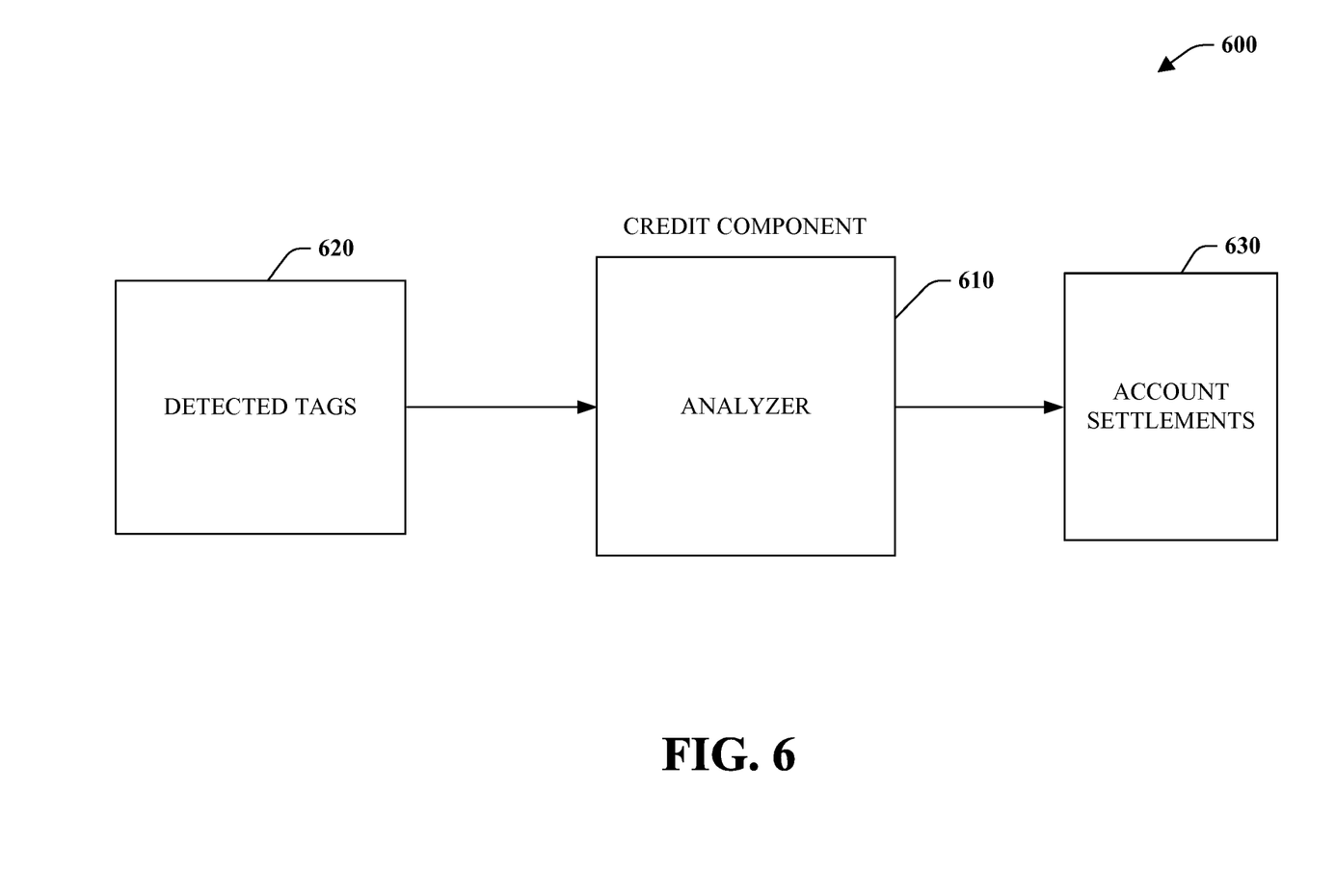
FIG. 6 illustrates financial processing for automated intellectual property transactions.

Referring to FIG. 6, a system 600 illustrates financial processing for automated intellectual property transactions. The system 600 includes an analyzer 610 that processes one or more tags 620 to determine royalty or other intellectual property rights. For instance, the tags 620 may be traced to individual owners who are then credited via electronic account settlements 630. The analyzer can cooperate with a micro point distribution component where the tags 620 can be analyzed and credit reporting and account settlement performed at 630. For example, the distribution component and analyzer 610 could be a cell phone or music device that receives micro components from the Internet over a wireless connection. The tags 620 are then reported to the analyzer 610 before other related IP components can be enabled. Reporting can be performed by the analyzer 610 in substantially real time or buffered for reporting at some later time. For example, a user of micro point distribution may have an account with a credit reporting component (not shown) that is accountable at some other time. After the tags have 620 been received by the analyzer 610, the entities associated with the tags 620 can be compensated at 630 for their respective contributions.

Before proceeding, it is noted that the system 600 can be provided in conjunction with an automated billing and provisioning system to facilitate micro transactions between entities. This can include one or more processing engines that respond to external billing and provisioning events and operate according to a plurality of rules that are associated with a respective processing engine. Events can include internally determined events within the processing engines and generally conform to a subscription event model. The model represents state transitions that a subscription may pass through in a subscription lifecycle (e.g., subscription for online services such as e-mail, subscription to use IP). An example of such events can include: Subscription Pre-Purchase, Subscription Purchase, Subscription Sponsorship, Subscription Cancel, Subscription Disable, Subscription Enable, Subscription Convert Out Of, Subscription Convert Into, Subscription Renewal, Subscription Usage Event Report, Subscription To Expire, User Service Profile Change, Subscription Expiration, Service Allocation, Service De-allocation, Service Suspension, and Service Enable. It is to be appreciated that other such events can be defined in accordance with the present invention.

The rules can include service delivery rules, qualification rules, rating rules, and/or other type rules that facilitate billing and provisioning processing in accordance with the processing engines. Depending on the nature of the events, the processing engines apply a set or subset of the rules that are associated with the events. For example, service delivery rules define atomic units of service to be delivered that include data about the type of service, service level delivery, and/or associated resource balance relating to performance and payment of a service. Qualification rules define eligibility requirements for purchase of a respective service. These rules can be created to restrict and/or alter purchasing of services to a limited set of users, user languages, currencies, countries, tenants, service providers, existing services and/or offerings owned, affiliation with a particular tenant, payment via a particular method, and so forth. Rating rules facilitate determining balance impacts to currency balances that result in charges and/or include non-currencies that monitor consumption and allocation of services. These rules can be defined within the scope of an individual offering to be processed in the context of the subscription event model, described above.

A Subscription Platform Service (SPS) can be provided that includes one or more Subscription Platform Objects (SPO) in order to establish and maintain billing, provisioning, and account relationships between entities. The SPS can be employed to create a billing account, authorize the customer's credit card or other instrument with an associated financial institution, and notifies the service provider to begin offering services to the customer. As services are performed by the service provider for example, the SPS bills the customer's account. Other parties or entities that are involved with the SPS include customer service components to provide on-going support and management of customer accounts. Payment providers (e.g., banks, financial institutions) facilitate payment of customer accounts. Financial and business operations can employ the SPS for data manipulation and analysis, if desired, whereas product operations can utilize the SPS to determine and provide product catalog offerings such as with packaged services, for example.

An Extensible Markup Language (XML) schema can be provided that defines platform objects for provisioning, billing and/or customer care. For example, the objects can include Accounts, Payment Instruments, Offerings, Service Components, Subscriptions, Service Instances, Role Assignments, Permits, Resources, Billing Statement Period Information, Billing Statement Payment Information, Billing Statement Line Items, Comments, and/or Settlement Information to name possible object functionality.

Figure 7:
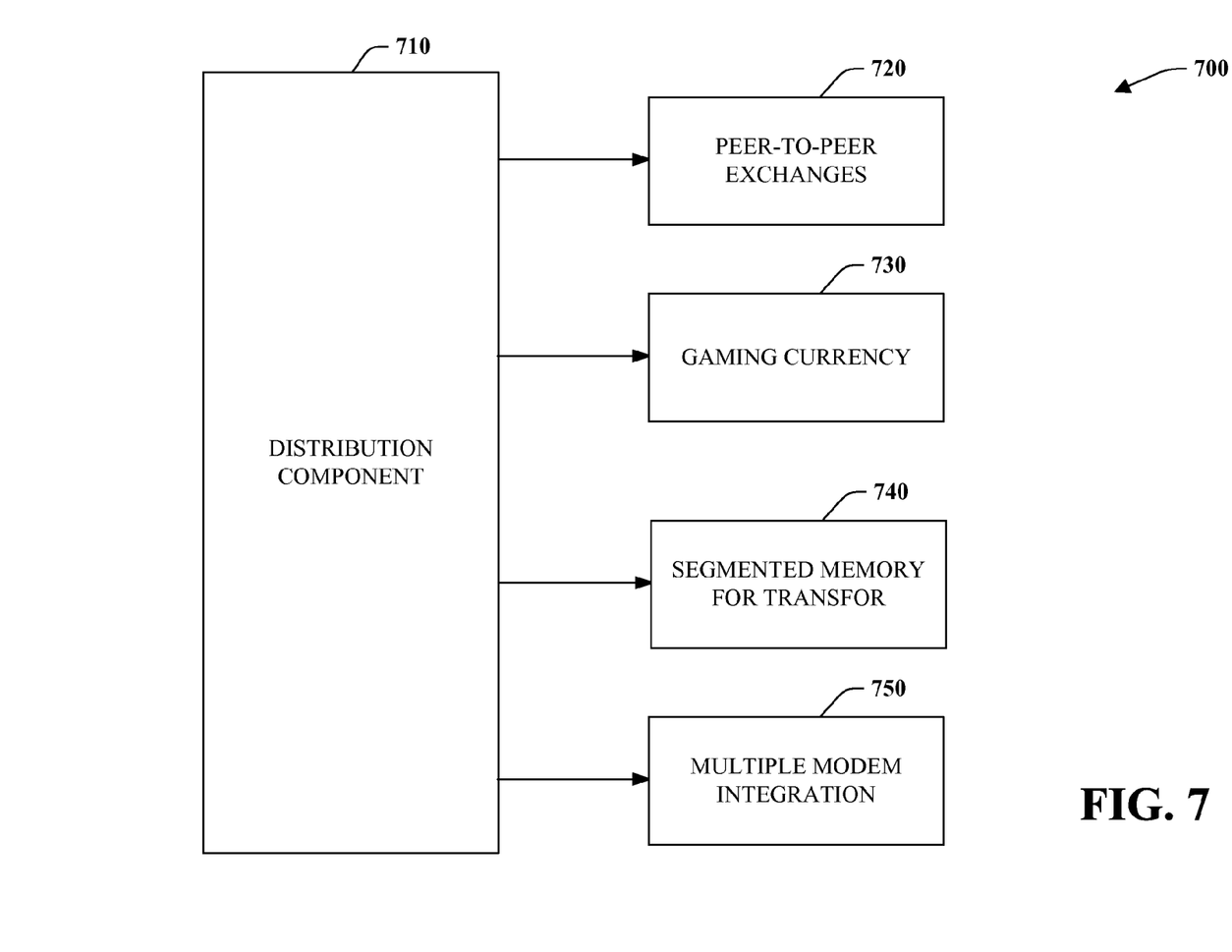
FIG. 7 illustrates a system that utilizes summarized data to build a current interests database.

Referring to FIG. 7, a system 700 illustrates example distribution component aspects. In this aspect, various examples aspects of a distribution component 710 are illustrated. In one example, distribution components 710 can include peer to peer exchange of data at 720 between devices to mitigate or eliminate cell tower exchanges. For example, data could be communicated to an individual's cell phone device and redistributed from the device to another device via line of site wireless communications. In another example aspect for property distribution, universal or electronic gaming currencies 730 can be developed to facilitate collaborations and legal maneuvers across borders. These can include agreed upon denominations, translations, and exchange rates to develop a currency that may not be subject to individual government control but recognized to compensate intellectual property creators. In yet another distribution aspect, users can be allowed to offer carrier services at 740 where they can rent a portion of their memory device and deliver such data as they travel. For instance, a user having an extra gig of storage can load data, carry the data to some other destination, and unload the data at the destination. Other aspects include multiple modem integration 750 in a device to support distribution services. Thus, devices can be equipped with various communications capabilities to support a plurality of various transactions.

Figure 8:
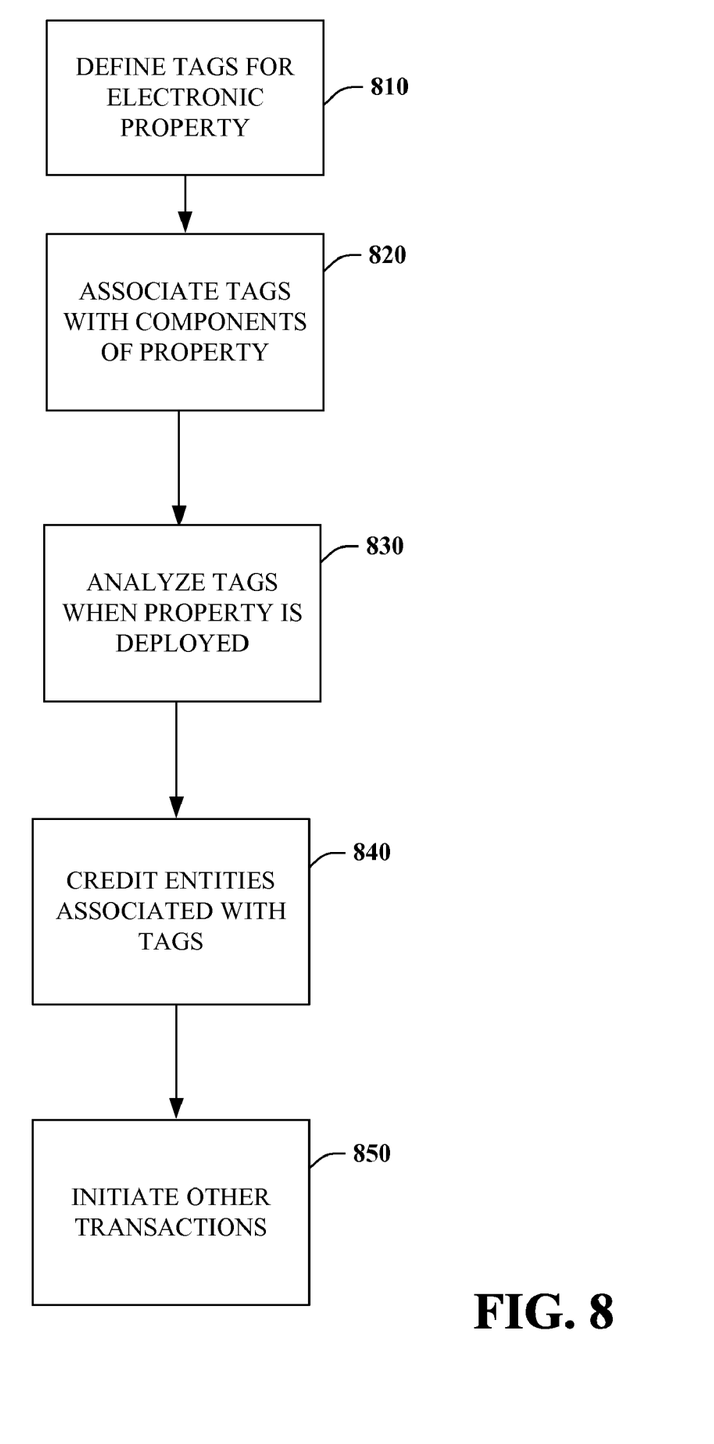
FIG. 8 illustrates an exemplary distribution component for intellectual property management.

FIG. 8 illustrates an exemplary process 1000 for automatically distributing and managing intellectual property. While, for purposes of simplicity of explanation, the process is shown and described as a series or number of acts, it is to be understood and appreciated that the subject processes are not limited by the order of acts, as some acts may, in accordance with the subject processes, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject processes described herein.

Proceeding to 810, tags are defined for intellectual property or electronic property. Such tags can be associated with a schema and generally define links back to the underlying creators of the property. At 820, the tags defined at 810 are associated with one or more components of intellectual property. For example, if a derivate work having four separate authors involved, then four tags can be involved that define the respective pieces of the derivative property. At 830, tags are analyzed as electronic property is deployed. This can include distribution components and analyzers that inspect individual property to see if the components defining such property are being properly credited. This may include an analysis of a schema that defines rights for a given piece of data and comparing received tags or metadata to the respective schema. Proceeding to 840, credit is provided to those entities that are identified by the tags analyzed at 830. This can include crediting an account or sending billing statements out to entities that may have used a particular piece of data. At 850, if there are any issues detected with a received piece of data such as a missing tag or otherwise for a component of intellectual property, then other transactions can be initiated such as licensing agreements, royalty payments, billing arrangements, or law suit initiation and management.

Figure 9:
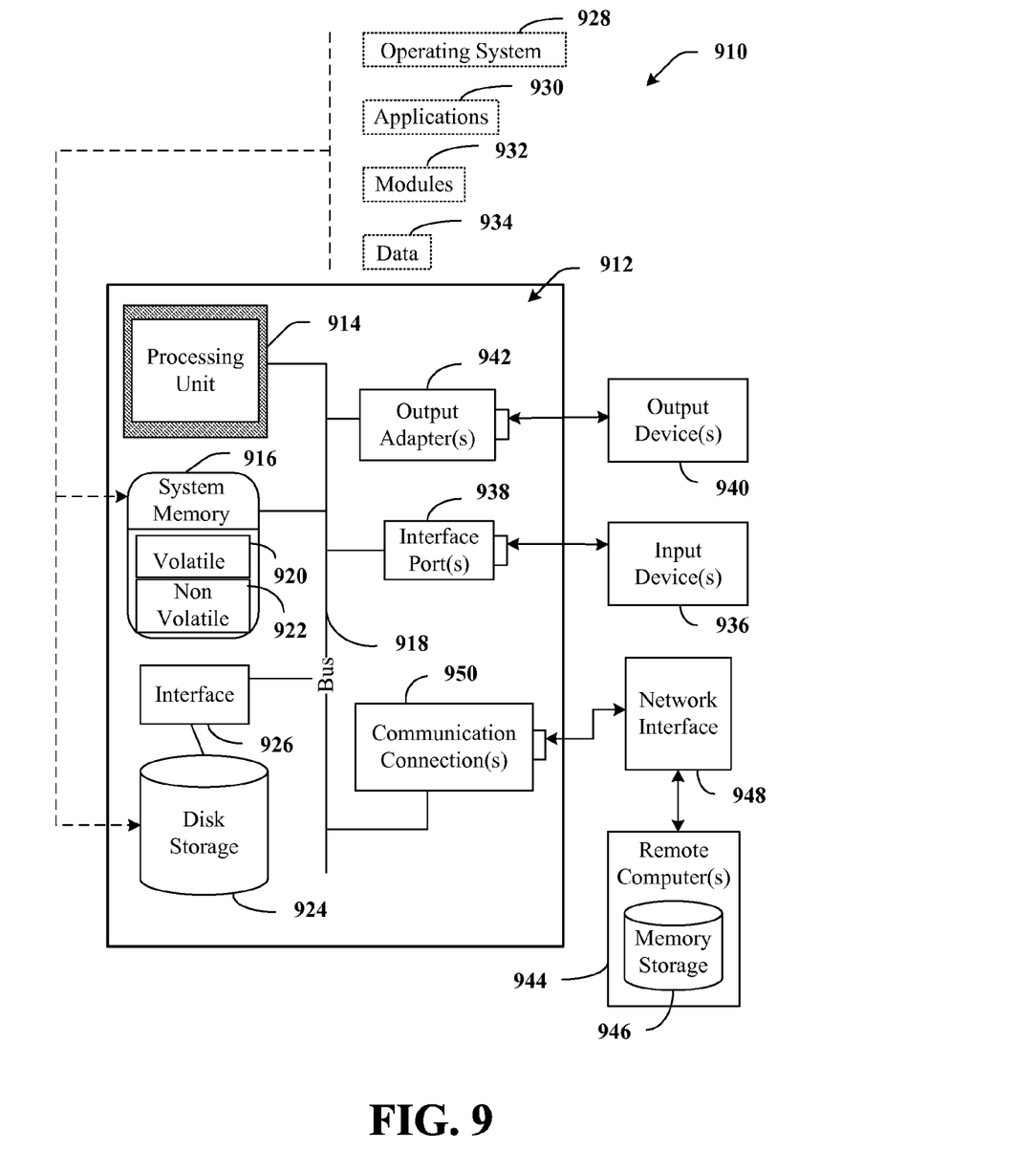
FIG. 9 is a schematic block diagram illustrating a suitable operating environment.
Figure 10:
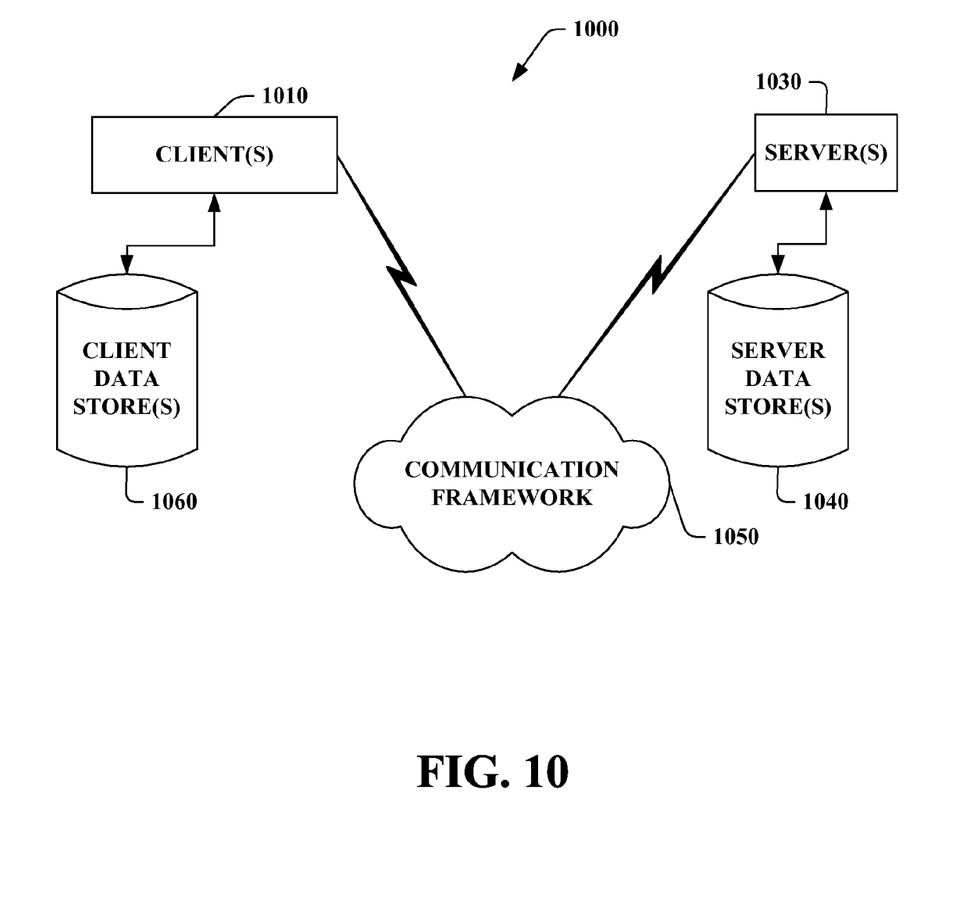
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that performs particular tasks and/or implements particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 9, an exemplary environment 910 for implementing various aspects described herein includes a computer 912. The computer 912 includes a processing unit 914, a system memory 916, and a system bus 918. The system bus 918 couple system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 64-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912 and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system to facilitate royalty tracking, the system comprising:
   a memory;
   one or more micro components comprising one or more tags, stored in the memory, the one or more micro components providing tracing, tracking, and accounting capabilities for data, wherein at least one of the micro components enables dynamic advertising to provide incentive for participation in a promotion regarding the data;
   one or more of the one or more tags stored in the memory to identify a portion of a first creative work, the portion representing a subset of portions comprising the first creative work; and
   a processor coupled to the memory, the processor executing components stored in the memory that comprise:
   a distribution component to track the portion of the first creative work;
   a crediting component to report a usage of the portion, when the portion is detected in a second creative work;
   one or more security components to ensure that the portion of the first creative work remains intact to the one or more tags to mitigate non-permitted access to tagged data of the portion of the first creative work, the one or more security components to prevent extraction of the portion from the first creative work without the tag;
   authorized works data to indicate limits on uses of creative works;
   an arbitration component to determine if limits on uses of the second creative work, indicated by the authorized works data, indicate all entities that are associated with tags within the second creative work;
   a micro transaction component to initiate transactions if the arbitration component determines that limits on uses of the second creative work do not indicate all entities associated with tags within the second creative work, the transactions including licensing agreements or royalty payments; and
   a derivative property component to create a derivative work by:
     associating each of a plurality of intellectual properties with a tag;
     combining the associated plurality of intellectual properties and their associated tags to form the derivative work;
     associating the derivative work with a further tag; and
     encrypting the plurality of intellectual properties using respective tags of the intellectual properties as keys in the encryption, such that removal of tags prevents decryption and presence of tags allows transactions by operation of the micro transaction component.

2. The system of claim 1, wherein the plurality of intellectual properties are based on a plurality of different components, including a screen play, a musical score and an art design, and the derivative property component is a movie.

3. The system of claim 2, wherein the contribution is associated with text, audio, video, image, schema, or electronic file data.

4. The system of claim 1, wherein the derivative property component associates tags from different authors to a collective work.

5. The system of claim 1, wherein the one or more security components ensure the tagged data functions as intended.

6. The system of claim 1, further comprising a micro point distribution component configured to perform acts comprising:
   receive one or more portions of the first creative work;
   analyze one or more tags associated with the one or more portions of the first creative work;
   report the one or more tags to a credit reporting component; and
   in response to reporting the one or more tags, enable access to the one or more portions of the first creative work for the one or more portions to be deployed in the second creative work.

7. The system of claim 6, wherein the micro point distribution component is associated with a mobile device.

8. The system of claim 6, wherein the micro point distribution component is associated with a settlement component to credit an account associated with the tag.

9. The system of claim 1, wherein the micro transaction component is associated with a digital rights management (DRM) component.

10. The system of claim 1, further comprising an aggregator to facilitate creation of a collective creative work from two or more portions of one or more creative works.

11. The system of claim 10, further comprising employing a third party system to form the collective creative work.

12. The system of claim 1, further comprising a licensing schema including a model for an arrangement of one or more tags and text to comprise a valid agreement to facilitate an exchange of one or more documents for micro licensing of one or more tags and for negotiation tracking, wherein the licensing schema is used for machine validation of the one or more documents such that when a document complies with each of one or more constraints of the model, the document is deemed valid.

13. The system of claim 12 wherein the licensing schema is configured to incorporate information for facilitating the exchange of the one or more documents for micro licensing, the information comprising: tag information, business identifiers, legal agreements, permissions, security preferences, third party interests, credit preferences, or financial components.

14. The system of claim 1, further comprising a portable data distribution component that is carried by an individual.

15. A system to facilitate royalty tracking, comprising:
   a processor;
   a memory, containing processor-executable statements, executable by the processor;
   at least two tags, defined in the memory, to identify at least two portions of a creative work, respectively;

a distribution component, defined in the memory, to track the portions of the creative work;

a crediting component, defined in the memory, to report usage of the creative work when the portions are detected in a larger body of work;

authorized works data, defined in memory, to indicate limits on uses of creative works;

an arbitration component, defined in the memory, to determine if limits on uses of the creative work, indicated by the authorized works data, indicate that all entities are associated with a tag within the creative work;

a micro transaction component, defined in the memory, to initiate transactions if the arbitration component determines that limits on uses of the creative work do not indicate that all entities are associated with a tag within the creative work, the transactions including licensing agreements or royalty payments; and a derivative property component to create a derivative work by:
  associating each of a plurality of intellectual properties with a tag, the plurality of intellectual properties being based on a plurality of different components, including a screen play, a musical score and an art design;
  combining the associated plurality of intellectual properties and their associated tags to form the derivative work, the derivative work being a movie;
  associating the derivative work with a further tag; and
  encrypting the plurality of intellectual properties using respective tags of the intellectual properties as keys in the encryption, such that removal of tags prevents decryption and presence of tags allows transactions by operation of the micro transaction component.

16. The system of claim 15, wherein the tags provide a historical link to entities who have contributed intellectual property to an electronic file.

17. The system of claim 15, wherein the derivative property component associates tags from different authors to a collective work.

18. The system of claim 15, further comprising one or more security components to facilitate that data remains substantially intact to mitigate non-permitted access to tagged data.

19. A system to facilitate royalty tracking, comprising:
a processor;
a memory, containing processor-executable statements, executable by the processor;
one or more tags, defined in the memory, to identify one or more portions of a creative work, respectively, the one or more portions of the creative work being encrypted and the respective tags of the one or more portions of the creative work being keys to the encryption;
a distribution component, defined in the memory, to track the one or more portions of the creative work;
a crediting component, defined in the memory, to report usage of the creative work when the portions are detected in a larger body of work;
authorized works data, defined in memory, to indicate limits on uses of creative works;
an arbitration component, defined in the memory, to compare limits on uses, indicated by the authorized works data, to the one or more tags within the creative work, and to determine if all entities are associated with a tag within the creative work;
a micro transaction component, defined in the memory, to initiate transactions if the arbitration component determines that limits on uses of the creative work do not indicate that all entities are associated with a tag within the creative work, the transactions including licensing agreements or royalty payments.

20. The system of claim 19, further comprising a micro point distribution component, where the at least two tags are analyzed and credit reporting is performed.

* * * * *